March 27, 1962     H. L. BURNETT     3,026,645
FISHHOOK ASSEMBLY
Filed May 8, 1959
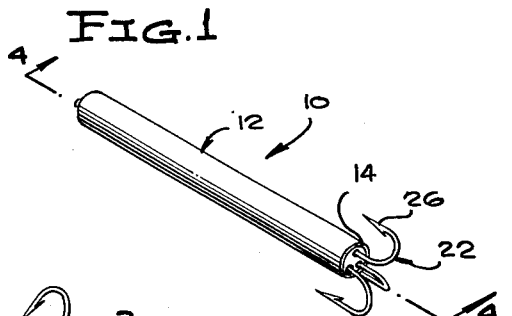
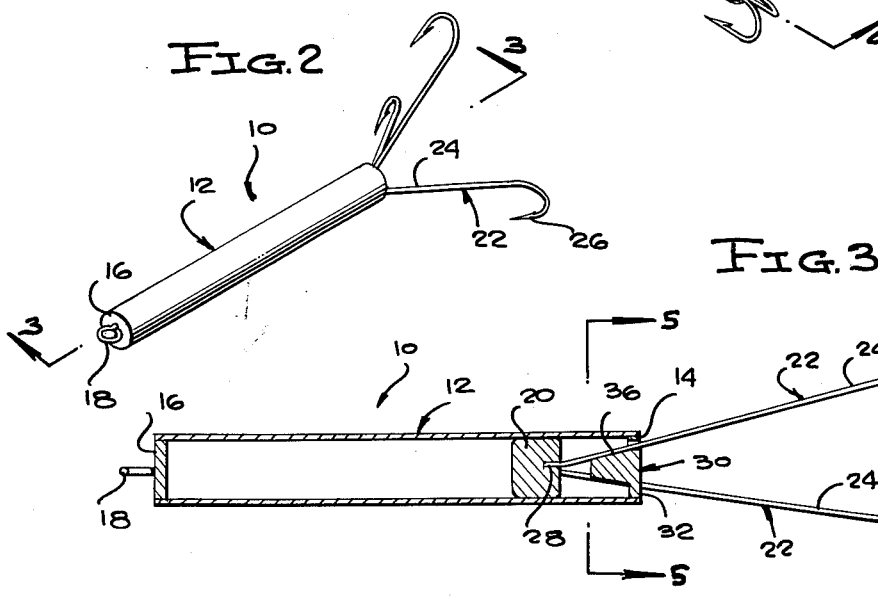
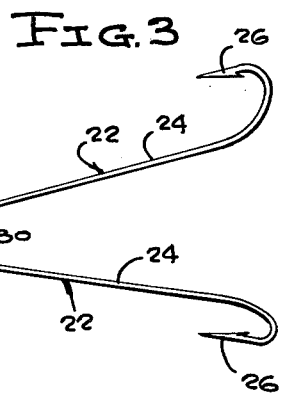
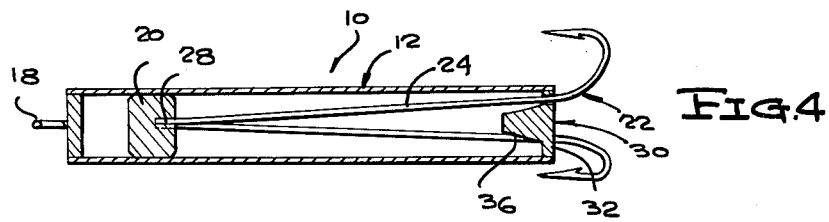
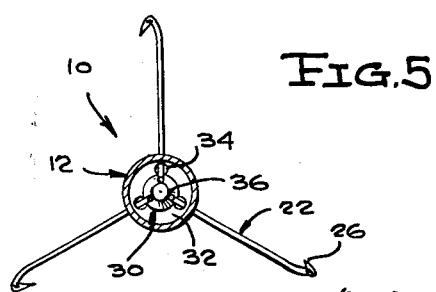
INVENTOR.
HARVEY L. BURNETT
BY
*McMorrow, Berman + Davidson*
ATTORNEYS

United States Patent Office 3,026,645
Patented Mar. 27, 1962

3,026,645
FISHHOOK ASSEMBLY
Harvey L. Burnett, 201 N. Pine St., De Ridder, La.
Filed May 8, 1959, Ser. No. 812,051
5 Claims. (Cl. 43—37)

The present invention relates to a fishhook assembly of the type which has two or more barbs which penetrate opposite sides of the mouth of a fish when a bait is taken.

Previously proposed and presently in use are fishhooks employing one or more barbs which are actuated by spring means into penetrating engagement with the sides of the mouth of a fish when the bait is taken. Such fishhooks have not been wholly successful for many reasons. Frequently, such a fishhook is unsuccessful for the reason that its spring is too lightly loaded for the purpose intended and fails to drive the fishhooks into the sides of the mouth of the fish with sufficient force to impale the fish thereon. The increasing of the loading of the spring means of such a fishhook often fails to correct this defect for the reason that with the spring more heavily loaded, the release means for the spring or spring means may fail to release when a less than average size fish takes the bait from such fishhook. Additionally, the fishhooks of the type described are difficult to handle and store with other fishing tackle due to the spring-load of the barbs which may inadvertently be released while being handled. Besides entangling the barbs of such a fishhook with other fishing tackle, the spring-loading of the barbs is a source of considerable annoyance and possible hazard to the user of the fishhook.

An object of the present invention is to provide a fishhook assembly having barbs that spring away from each other when a bait is taken from the fishhook, one having positive means for driving the barbs away from each other and into the opposite sides of the mouth of a fish when a bait is taken, and one which employs other than spring means for effecting the positive driving action of the barbs.

Another object of the present invention is to provide a fishhook asembly having barbs which are driven into opposite sides of the mouth of a fish when a bait is taken which lends itself to storage with ease and facility and without chance of inadvertently releasing the barbs from the nested position as stored.

A further object of the present invention is to provide a fishhook assembly which lends itself to manufacture in all sizes and of such materials as found practical, one which is sturdy in construction and of few and simple components, one which lends itself to manufacture in large quantity at relatively low cost, and one which is highly effective in action.

These and other objects and advantages of the present invention will be fully apparent from the following description when taken in conjunction with the annexed drawing, in which:

FIGURE 1 is an isometric view of the fishhook assembly of the present invention, shown with the fishhooks in retracted or nested position;

FIGURE 2 is an isometric view of the assembly shown in FIGURE 1, with the fishhooks in extended position;

FIGURE 3 is a view on an enlarged scale, taken on the line 3—3 of FIGURE 2;

FIGURE 4 is a view on an enlarged scale, taken on the line 4—4 of FIGURE 1; and

FIGURE 5 is a view taken on the line 5—5 of FIGURE 3.

Referring in greater detail to the drawing in which like numerals indicate like parts throughout the several views, the fishhook assembly of the present invention is designated generally by the reference numeral 10 and comprises an elongated tube 12 open at one end 14 and closed at the other end 16, the internal diameter of the tube 12 being the same throughout its entire length. An eye formation 18 projects exteriorly of the disc which closes the end 16 of the tube 12 and forms a means by which a fishing line (not shown) may be attached to the fishhook assembly of the present invention.

An anchoring element, in the form of a solid conformably shaped to snugly fit within said tube 12 or cylindrically shaped body 20, is positioned within the tube 12 and is movable toward and away from the open end 14 of the tube 12. Fishhooks, shown as three in number and designated by the numeral 22, are normally arranged in spaced nested relation within the tube 12, as shown in FIGURE 1. Each fishhook 22 has a shank 24 and a barb 26 on one end thereof. The ends of the shanks 24 of each of the fishhooks 22 remote from the barbs 26 are anchored solidly in the body 20, as at 28 in FIGURES 3 and 4.

A guiding and supporting member, in the form of a plug 30 having a flange 32 circumposed about one end, is positioned within the tube 12 inwardly of and adjacent the open end 14 of the latter and is fixedly secured to the tube 12 by suitable cement or other attaching means.

The flange 32 is provided with a plurality of openings 34 extending therethrough and positioned inwardly of the periphery of the flange 32. The periphery is fixedly attached to the tube 12.

The portion of the plug 30 inwardly of the flange 32 has a frusto-conical shaped guiding surface, as at 36 in FIGURES 3 and 4, disposed with the large end adjacent to the flange openings 34 and with the small end inwardly of and spaced from the openings 34.

The shank 24 of each fishhook 22 has an intermediate portion projecting slidably through one of the openings 34 in the flange 32. The barbs 26 of the fishhooks 22 are exteriorly of the tube open end 14 and are movable from the nested converged position shown in FIGURE 1 to the diverged position shown in FIGURE 2 upon execution of movement of the body 20 from the normal position adjacent to and spaced from the tube closed end 16 to a position approaching and spaced from the plug 30.

The barbs 26 of the fishhooks 22 face away from the guide member or plug 30 in both of the positions of nested against the plug 30, as shown in FIGURE 1 and in the diverged position away from the plug 30, as shown in FIGURE 2.

In use, a fishing line is attached to the eye formation 18 and bait (not shown) is either slipped down to the body of the tube 12 or is anchored in the portions of the fishhooks 22 adjacent the barbs 26. The bait may be attached to one fishhook 2 or several baits may be attached, one to each fishhook 22. Upon casting of the fishhook assembly 10 with the bait attached into a body of water, upon taking of the bait by a fish on one or more fishhooks 22, the application of a pulling force by the fish to one of the barbs 26 will effect the sliding movement of the body 20 from the position adjacent the closed end 16 toward the open end 14 with the result that the intermediate portions of the shanks 24 of the fishhooks 22 will engage the guiding surfaces or surface 36 of the plugs 30 so as to project the fishhooks 22 to a position out of the open end of the tube 12 with the projecting portions in diverging directions and with the barbs 26 engaging opposite sides of the mouth of the fish which has taken the bait.

Upon the application of a manually directed force to the fishhooks 22 to reinsert them through the openings 34 in the flange 32, the barbs 26 will converge together and make possible the removal of the fish caught thereon.

What is claimed is:

1. In a fishhook assembly, a tube having the same internal diameter throughout its length and open at one end, an anchoring element in the form of a solid body conformably shaped to fit snugly within said tube positioned within said tube and movable toward and away from the open end of said tube, at least two fishhooks each including a shank and a barb on one end of the shank, said shanks arranged in spaced nested relation within said tube when said element is away from the open end of said tube and each fishhook having the other end of the shank connected to said anchoring element, and a guiding and supporting member positioned within said tube inwardly of and adjacent the open end and fixedly attached to said tube, said member being provided with at least two openings extending therethrough and a guiding surface inwardly of and adjacent each opening, said guiding surface diverging rearwardly the barbs of said fishhooks being exteriorly of the open end of said tube with the portions of the shanks intermediate the ends extending slidably through said openings, said fishhooks upon application of a pulling force to the barb of one fishhook being projectable in diverging directions out of the open end of said tube upon contact of said shanks with the adjacent guiding surfaces.

2. In a fishhook assembly, a tube having the same internal diameter throughout its length and open at one end, an anchoring element in the form of a solid body conformably shaped to fit snugly within said tube positioned within said tube and movable toward and away from the open end of said tube, at least two fishhooks each including a shank and a barb on one end of the shank, said shanks, arranged in spaced nested relation within said tube when said element is away from the open end of said tube and each fishhook having the other end of the shank connected to said anchoring element, and a guiding and supporting member positioned within said tube inwardly of and adjacent the open end and fixedly attached to said tube, said member being provided with at least two openings extending therethrough and a guiding surface inwardly of and adjacent each opening, said guiding surface diverging rearwardly the barbs of said fishhooks being exteriorly of the open end of said tube with the portions of the shanks intermediate the ends extending slidably through said openings, the barbs of said fishhooks facing away from said member, said fishhooks upon application of a pulling force to the barb of one fishhook being projectable in diverging directions out of the open end of said tube upon contact of said shanks with the adjacent guiding surfaces.

3. In a fishhook assembly, a tube having the same internal diameter throughout its length and open at one end, an anchoring element in the form of a solid body conformably shaped to fit snugly within said tube positioned within said tube and movable toward and away from the open end of said tube, at least two fishhooks each including a shank and a barb on one end of the shank, said shanks arranged in spaced nested relation within said tube when said element is away from the open end of said tube and each fishhook having the other end of the shank connected to said anchoring element, and a guiding and supporting member embodying a plug having a flange on one end conformably shaped to fit within the open end of said tube positioned within said tube inwardly of and adjacent the open end and having the periphery of said flange fixedly attached to said tube, said flange being provided with at least two openings extending therethrough, the portion of said plug inwardly of said flange having a guiding surface, said guiding surface diverging rearwardly the barbs of said fishhooks being exteriorly of the open end of said tube with the portions of the shanks intermediate the ends extending slidably through said openings, said fishhooks upon application of a pulling force to the barb of one fishhook being projectable in diverging directions out of the open end of said tube upon contact of said shanks with the adjacent guiding surface.

4. In a fishhook assembly, a tube having the same internal diameter throughout its length and open at one end, an anchoring element in the form of a solid body conformably shaped to fit snugly within said tube positioned within said tube and movable toward and away from the open end of said tube, at least two fishhooks each including a shank and a barb on one end of the shank, said shanks arranged in spaced nested relation within said tube when said element is away from the open end of said tube and each fishhook having the other end of the shank connected to said anchoring element, and a guiding and supporting member embodying a plug having a flange on one end conformably shaped to fit within the open end of said tube positioned within said tube inwardly of and adjacent the open end and having the periphery of said flange fixedly attached to said tube, said flange being provided with at least two openings extending therethrough, the portion of said plug inwardly of said flange having a frusto-conical shaped guiding surface disposed with the large end adjacent to said flange openings and with the small end inwardly of and spaced from said openings, the barbs of said fishhooks being exteriorly of the open end of said tube with the portions of the shanks intermediate the ends extending slidably through said openings, said fishhooks upon application of a pulling force to the barb of one fishhook being projectable in diverging directions out of the open end of said tube upon contact of said shanks with the adjacent guiding surface.

5. A fishhook comprising a tube having the same internal diameter throughout its length and open at one end and closed at the other end, means on said closed other end for attachment of a fishing line thereto, an anchoring element in the form of a solid body conformably shaped to fit snugly within said tube positioned within said tube and movable toward and away from the open end of said tube, at least two fishhooks each including a shank and a barb on one end of the shank said shanks arranged in spaced nested relation within said tube when said element is away from the open end of said tube and each fishhook having the other end of the shank connected to said anchoring element, and a guiding and supporting member positioned within said tube inwardly of and adjacent the open end and fixedly attached to said tube, said member being provided with at least two openings extending therethrough and a guiding surface inwardly of and adjacent each opening, said guiding surface diverging rearwardly the barbs of said fishhooks being exteriorly of the open end of said tube with the portions of the shanks intermediate the ends extending slidably through said openings, said fishhooks upon application of a pulling force to the barb of one fishhook being projectable in diverging directions out of the open end of said tube upon contact of said shanks with the adjacent guiding surfaces.

References Cited in the file of this patent

UNITED STATES PATENTS

| | | |
|---|---|---|
| 657,387 | Bew | Sept. 4, 1900 |
| 1,774,539 | Ahlfors | Sept. 2, 1930 |
| 2,242,592 | Noxon | May 20, 1941 |
| 2,357,357 | Premo | Sept. 5, 1944 |
| 2,456,665 | Adams | Dec. 21, 1948 |